Dec. 20, 1960 J. A. MARCHAND 2,964,813
TIE BACK CLIP
Filed July 2, 1957

INVENTOR.
JULIEN A. MARCHAND.
BY
Pearson & Pearson
ATTORNEYS.

United States Patent Office 2,964,813
Patented Dec. 20, 1960

2,964,813
TIE BACK CLIP

Julien A. Marchand, 244 Hall St., Manchester, N.H.

Filed July 2, 1957, Ser. No. 669,479

3 Claims. (Cl. 24—73)

This invention relates to tie-back clips or clamps.

It is the principal object of the invention to provide a spring clip for holding tie-backs that may be securely fastened to the stile of a window frame without marring the appearance thereof unduly.

Another object of the invention is to provide a spring clip for tie-backs in which the jaws rake rearwardly and are blunt toothed to frictionally grip the tie-back of a curtain the possibility of ripping the material of the tie-back thus being reduced.

A further object of the invention is to provide such a spring clip with removable decorative means for hiding the major portion of the clip thus enabling the substitution of various decorative colors to conform to changes in room decoration.

Other objects and advantages of the invention will be apparent from the claims, the description of the drawing and from the drawing in which:

Figure 1:
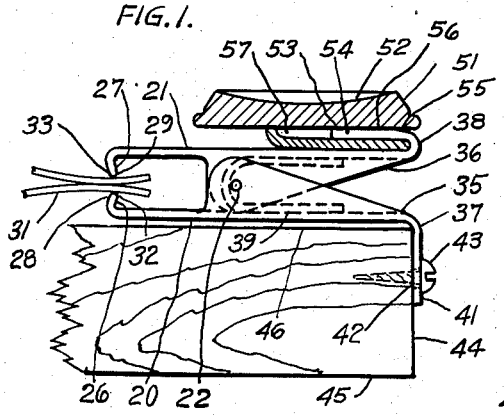
Fig. 1 is a side view, partly in section of a spring clip in accordance with the invention.
Figure 2:
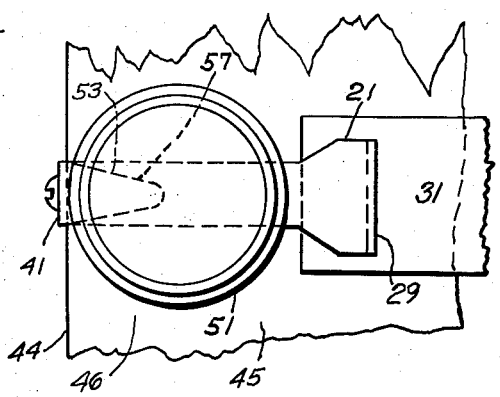
Fig. 2 is a plan view thereof.

As shown in the drawing, 20 and 21 are a pair of elongated members pivotally attached to each other intermediate of their ends at 22. Preferably members 20 and 21 are channeled and each includes a flat wall 23 and a pair of side walls 24 and 25.

At one end of the elongated channeled members 20 and 21 are corresponding clamping jaws 26 and 27 which preferably are lateral or transverse to the members 20 and 21. Each jaw 26 and 27 includes rounded teeth or serrations, such as 28 and 29, but the jaws are so bent inwardly from the flat walls 23 of members 20 and 21 as to rake rearwardly thereof. Thus, as shown in Fig. 1, the fabric of a curtain tie-back 31 is frictionally gripped between the tips 32 of teeth 28 and the tips 33 of teeth 29 as at 33. The rounded teeth 28 and 29 may enter the meshes of meshed fabric but since they are not sharp, the meshed fabric will pull over the teeth without tearing the material.

The other ends of the members 20 and 21 form corresponding handles 35 and 36 and the side walls 24 and 25 of each member are tapered downwardly from the area of pivot 22 to merge with the flat wall 23 thereof at 37 and 38 respectively.

A leaf spring 39 of a well known type is housed within the side walls 24 and 25 of each member 20 and 21 to urge the handles 35 and 36 apart and to urge the jaws 26 and 27 toward each other.

An integral right angular extension 41 is provided on one of the handles such as 35 and includes an aperture 42 for a screw or nail 43. The spring clip may thus be affixed to the side edge 44 of the stile 45 of a window frame with one screw only since the right angular construction prevents turning of the clip. In addition, there is no need to create a screw hole in the face 46 of the stile to thereby mar the appearance of the room. It should also be noted that the extension 41 permits the spring clip to be mounted at a spaced distance from the face 46, as illustrated, thereby avoiding any danger of frictional wear on the said face and reducing the accumulation of dust and dirt along the upper rear horizontal face of the clip in use.

A decorative element 51 is provided which may be in the form of a disc or button having a smooth surface 52, as shown, or having any desired decoration or color. Tongue and slot means is also provided for detachably connecting the decorative element 51 to the other handle 36 of the spring clip. As shown in Fig. 1, an integral extension 53 on handle 36 may be bent through 180° into a position parallel with the wall 23 thereof to form a tongue 54. A protuberance 55 on the underface 56 of the element 51 includes a slot 57 into which the tongue 54 slideably fits. The tongue 54 and slot 57 are of rectangular cross section to prevent tilting of the element 51 and the area of the element 51 is sufficient to at least cover the handle and pivot portions of the clip. Element 51, of course, also serves as a convenient means for opening the clip and various changes in the decoration of the room can be accompanied by suitable changes in the color or design of the elements 51 of the curtain clips.

Preferably the extension 41 of handle 35 and the extension 53 of handle 36 are both tapered as shown, the tapered extension 53 thus fitting tightly in the slot 57 when the element 51 is slid thereon.

Figure 3:
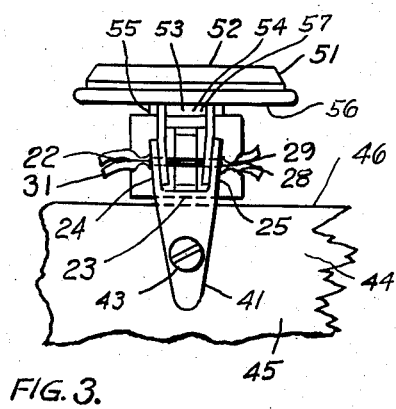
Fig. 3 is a rear view thereof.
Figure 4:
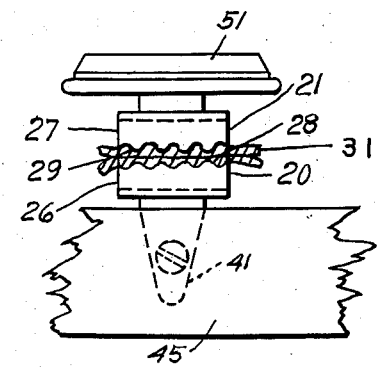
Fig. 4 is a front view thereof.

In the embodiment shown in Figs. 1–4 it should be noted that the members 20 and 21 are substantially identical in that a single die can be used for producing both members with their respective extensions 41 and 53. It is then only necessary to bend extension 41 through a 90° angle and extension 53 through an angle of 180° to convert the members to final form. As shown in Fig. 3 the side walls 24 and 25 may be suitably bent in the process of creating pivot 22 by peening, or insertion, of a pivot pin, to enable the identical members to pivot freely.

Figure 5:
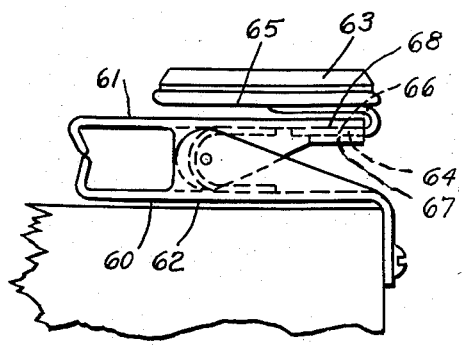
Fig. 5 is a view similar to Fig. 1 of a modification.

As shown in Fig. 5, the elongated members 60 and 61 of a clip 62 are similar to the members 20 and 21 except for the tongue and slot means for removably retaining the decorative element 63. As shown, the element 63 includes a tongue 64 extending parallel to the underface 65 thereof and of rectangular cross section. The member 61 includes a slot 66 adapted to slideably receive the tongue 64, the slot being formed by the cross piece 67 in cooperation with the flat bottom wall 68.

I claim:

1. A decorative spring clip for holding a tieback of a window curtain, said clip comprising a pair of elongated channel members, each having a pair of opposite, tapered side walls pivotally attached to the side walls of the other, intermediate of their ends and having corresponding clamping jaws at one end and corresponding handles at the other end thereof; spring means housed within the tapered side walls of said members for urging said handles apart, an integral, tapered, extension, disposed at a 90 degree angle at the end of one said handle, said 90 degree extension having an aperture for receiving an attachment screw; an integral, tapered extension of rectangular cross section disposed at a 180 degree angle at the end of the other said handle, said 180 degree extension constituting a tapered tongue overlying and spaced from said handle and a decorative button-like element, adapted to cover at least the handles of said clip, said element having a tapered slot of rectangular cross section fitting and slidably affixed on said tapered tongue for serving as a combined finger grip and removable decoration.

2. A combination as specified in claim 1 wherein said clamping jaws extend laterally of said elongated channel member and each jaw includes a row of spaced, blunt teeth, oppositely disposed to the teeth of the other jaw for tip to tip engagement.

3. A decorative spring clip for holding a tieback of a window curtain, said clip comprising a pair of elongated channel members each having a pair of opposite, tapered side walls pivotally attached to the side walls of the other intermediate of their ends; a leaf spring housed within the tapered side walls of said channel members; a pair of rearwardly raking clamping jaws at one end of said members, each jaw extending laterally thereof and having a row of spaced, rounded teeth oppositely disposed to the teeth of the other in tip to tip engagement for frictionally gripping a curtain without damage thereto; a pair of corresponding handles at the other end of said members; an integral tapered extension disposed at a 90 degree angle at the end of one said handle, said 90 degree extension having an aperture for receiving an attachment screw; an integral, flat tapered extension of rectangular cross section disposed at a 180 degree angle at the end of the other said handle, said 180 degree extension constituting a tapered tongue overlying, parallel to, and spaced from, said handle and a decorative, button-like element, adapted to cover at least the handle portions of said clip, said element having a tapered slot of rectangular cross section fitting, and slidably affixed on, said tapered tongue for serving as a combined finger grip and as a non tiltable, removable decoration.

References Cited in the file of this patent

UNITED STATES PATENTS

| | | |
|---|---|---|
| 812,800 | McLean | Feb. 13, 1906 |
| 1,208,379 | Royem | Dec. 12, 1916 |
| 1,844,774 | Locki | Feb. 2, 1932 |
| 2,084,738 | Manker | June 22, 1937 |
| 2,396,080 | Bruegger | Mar. 5, 1946 |
| 2,454,857 | Bish | Nov. 30, 1948 |
| 2,506,116 | Starkey | May 2, 1950 |
| 2,631,347 | Rinehart | Mar. 17, 1953 |
| 2,633,321 | Coulter | Mar. 31, 1953 |
| 2,867,873 | Scavetto | Jan. 13, 1959 |